UNITED STATES PATENT OFFICE.

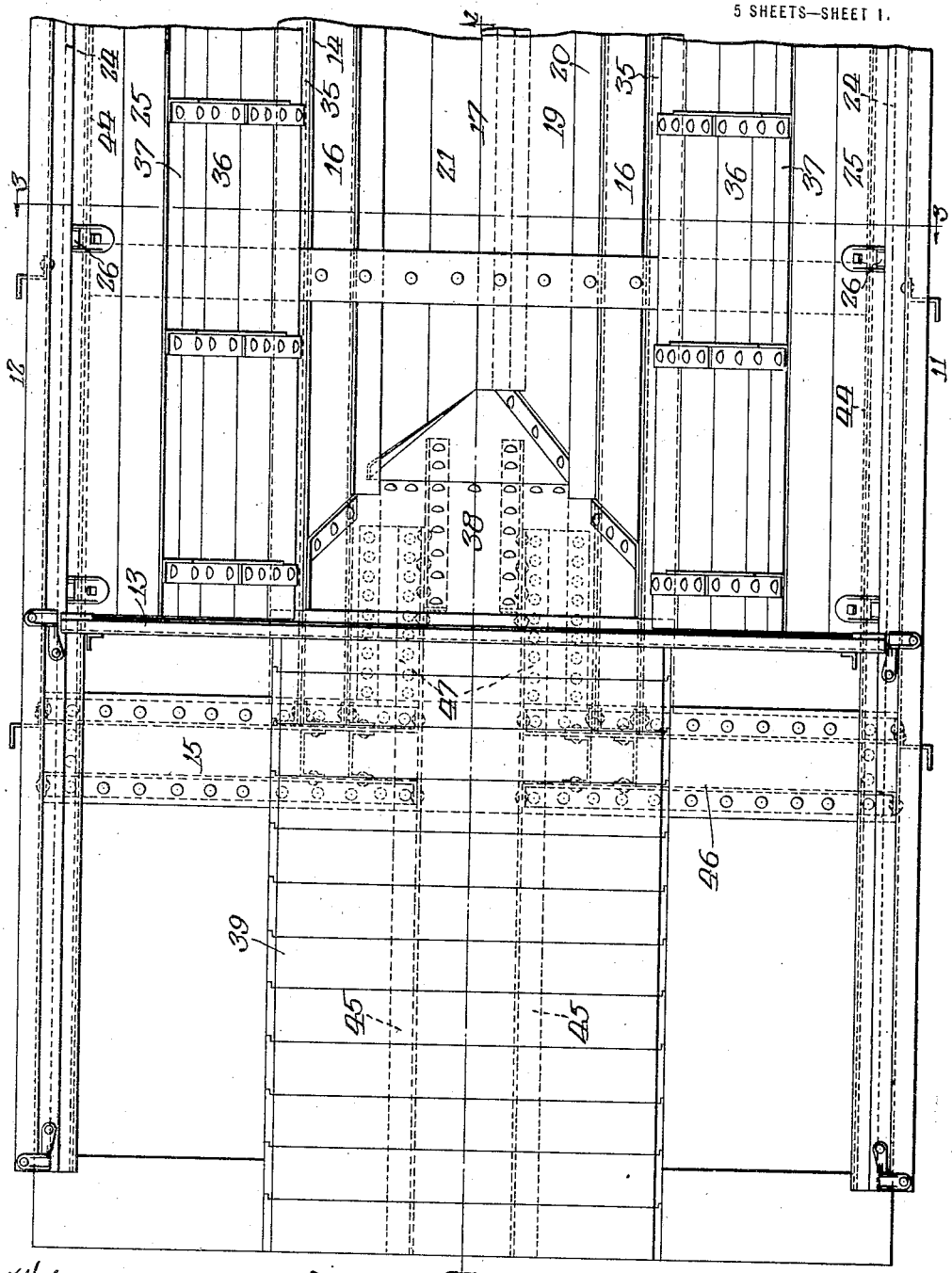

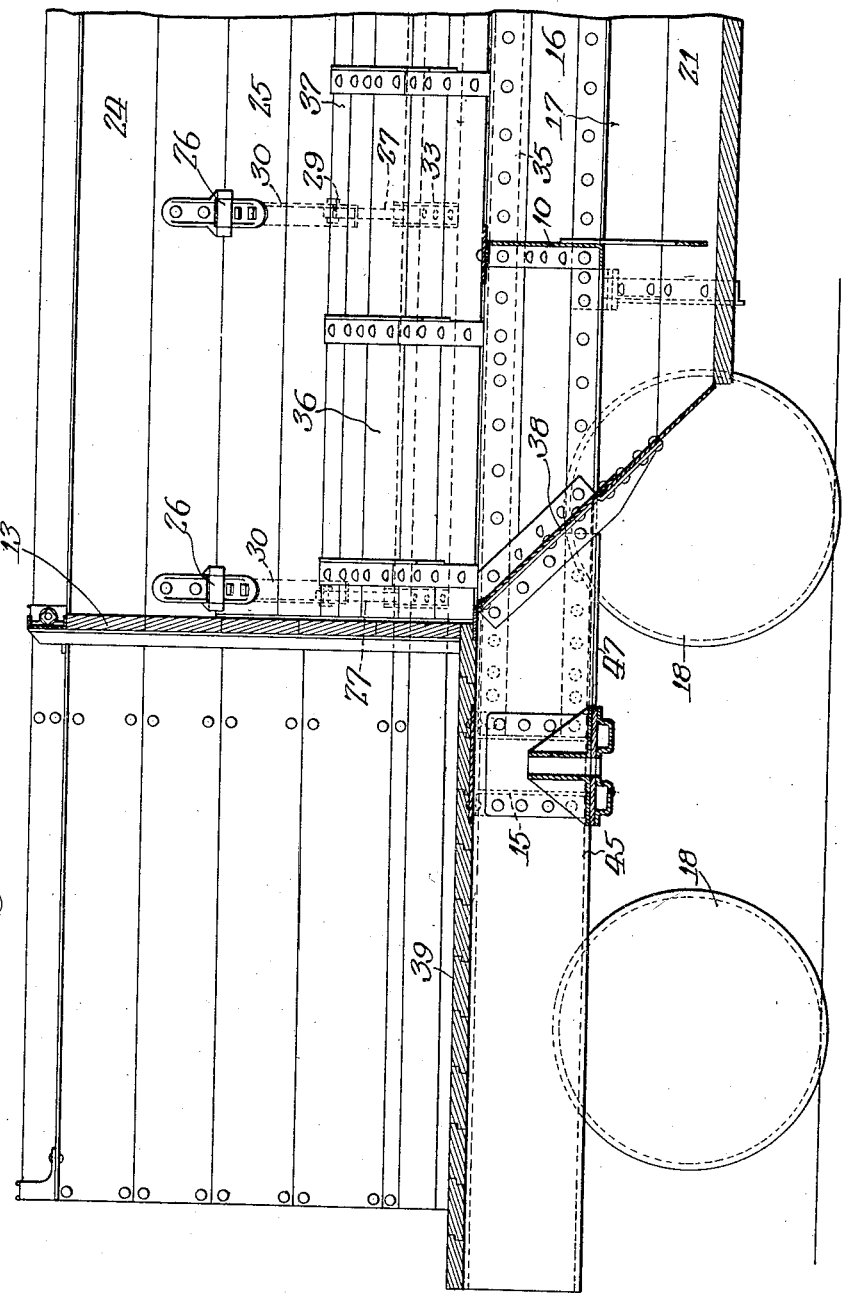

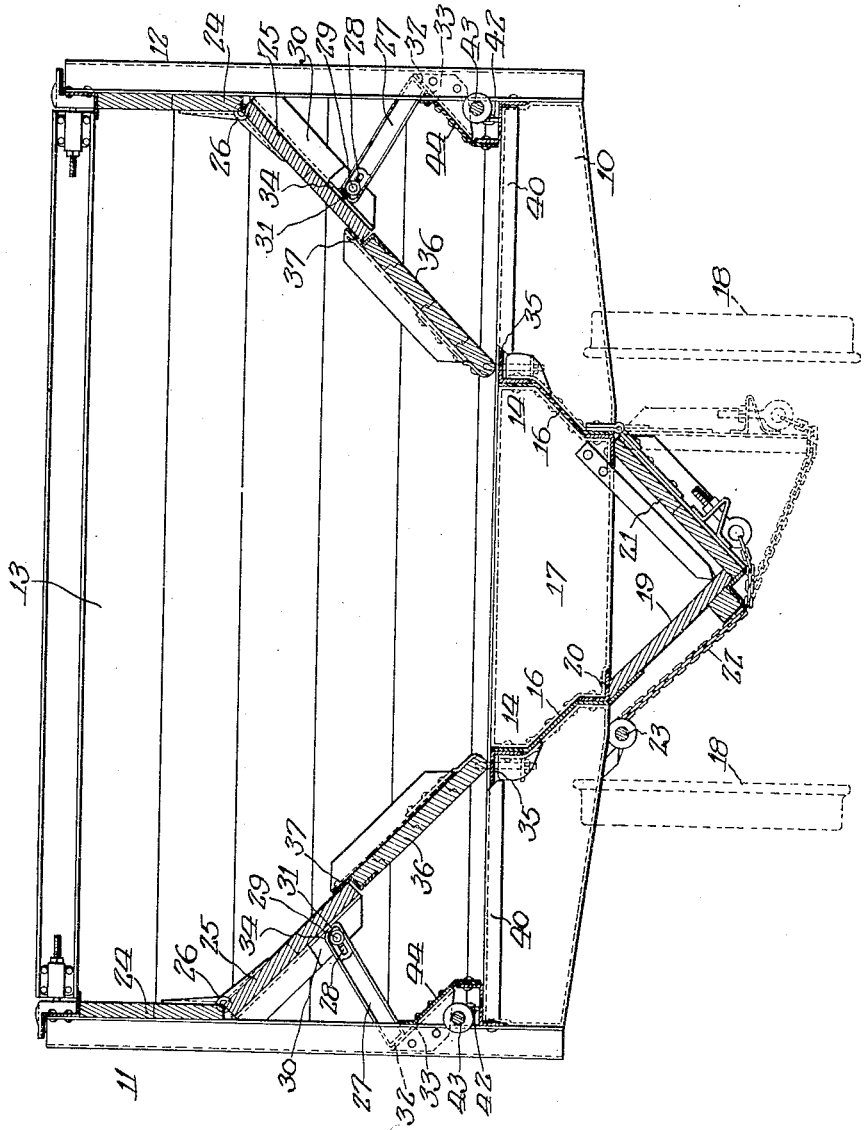

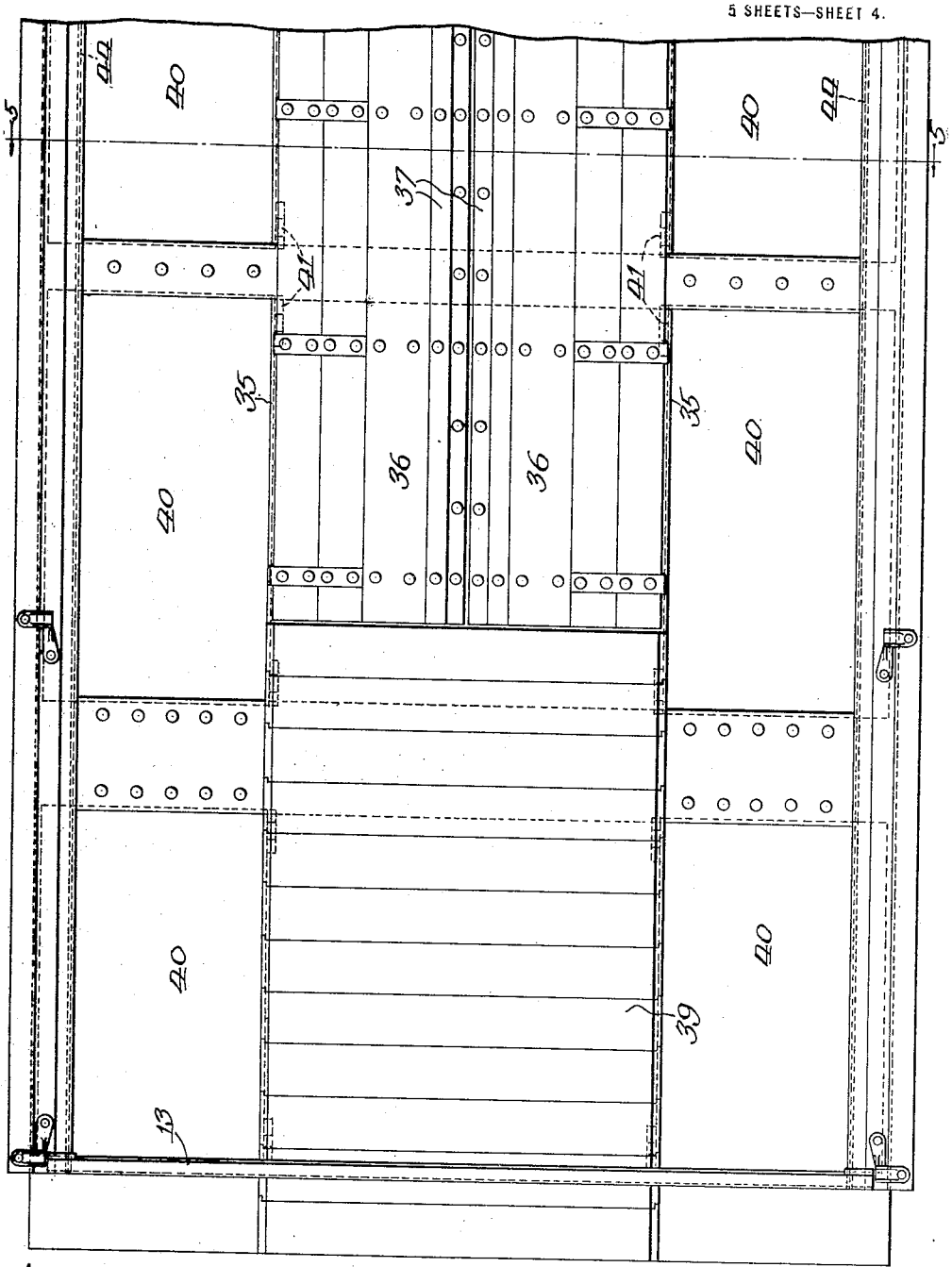

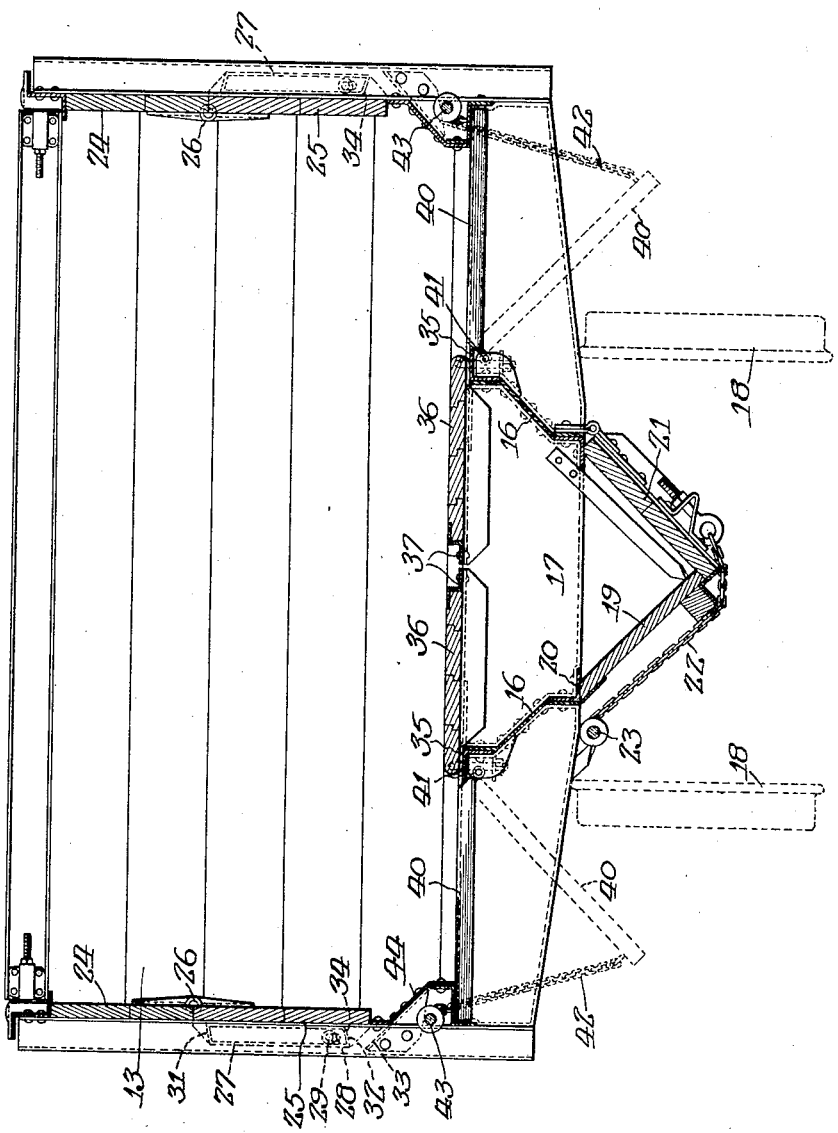

JOHN O. NEIKIRK, OF LOMBARD, ILLINOIS.

CONVERTIBLE RAILWAY-CAR.

1,330,950.  Specification of Letters Patent.  Patented Feb. 17, 1920.

Application filed November 19, 1917. Serial No. 202,689.

*To all whom it may concern:*

Be it known that I, JOHN O. NEIKIRK, a citizen of the United States, and resident of Lombard, in the county of Dupage and State of Illinois, have invented certain new and useful Improvements in Convertible Railway-Cars, of which the following is a specification.

This invention relates to convertible railway cars.

One of the objects of my invention is to improve the door arrangement of railway cars whereby the latter may be converted readily from a flat bottom car to a hopper type of car and vice versa.

Another object is to lighten and otherwise improve convertible cars whereby each of a plurality of parts performs various functions.

Another object is to lower the floor construction of a convertible car and at the same time locate the underframe thereof in a manner to prevent interference with the truck wheels.

Another object is to provide a convertible car adapted to meet the various requirements for successful commercial operation.

Generally speaking, these and other objects are accomplished by providing in a convertible car, the combination of floor and side wall doors which are movable to form a portion of the walls of a hopper, and associated sill members also arranged to form a portion of said hopper walls and being arranged to permit of a relatively low floor and hopper without interfering with the truck wheels.

The invention is illustrated on the accompanying sheets of drawings in which—

Figure 1 is a fragmentary plan view of my convertible car with the doors arranged to form a hopper type of car;

Fig. 2 is a longitudinal sectional view of the same taken in the plane of line 2—2 of Fig. 1;

Fig. 3 is a cross sectional view taken in the plane of line 3—3 of Fig. 1;

Fig. 4 is a fragmentary plan view of my convertible car showing the doors arranged to form a flat bottom, and Fig. 5 is a transverse sectional view taken in the plane of line 5—5 of Fig. 4.

The various novel features of my invention will be apparent from the following description and drawings and will be particularly pointed out in the appended claims.

Referring first to Figs. 1, 2 and 3 of the drawings, it will be noted that my convertible car is shown with the doors arranged to form a hopper construction. The lower frame construction of the car includes transverse frame members 10 for supporting the sides 11 and 12, ends 13 and floor of the car. The floor structure is further supported by longitudinally extending sill members 14 which extend between the bolster members 15 of the car. The sill members 14 have their main or intermediate portions 16 converge downwardly to form portions of the side walls of the hopper 17 in the lower portion of the car below the floor, it being appreciated that if the sill members had their intermediate portions 16 extending in a straight line vertically, said sill members would interfere with the truck wheels 18 and under rigging of the car. By arranging the web or main portions 16 of these sills so that they converge downwardly, the floor of the car can be made considerably lower, than otherwise could be the case, without causing interference with any part of the under frame and rigging and with the truck wheels. At the same time the hopper construction may be extended downwardly a considerable distance between the truck wheels. This arrangement of parts mentioned greatly lightens the car. A downwardly inclined shedding portion 19 of the hopper is permanently secured to one of the side sill members 16, and also to a strengthening angle 20. The corresponding part on the other side of the hopper takes the form of a door 21, which is pivotally connected at its upper end to a suitable support. Normally this pivotally mounted door 21 in the bottom of the hopper is held in its closed position by a chain 22 which is wound around a suitably supported operating shaft 23. If it is desired to dump the load, which may be ballast or the like, between the tracks, the same may be done by operating the shaft 23 in a manner to permit the pivotally mounted door to swing downwardly and outwardly.

The sides of the car 11 and 12 include portions 24 which are permanently secured in a given vertical position, and also include doors 25 which are pivotally mounted at their upper edges at 26 to the portions 24 of the sides of the car. Normally when the convertible car is arranged as a flat bottom car, these side wall doors 25 are arranged vertically, as shown in Fig. 5. But when the car is converted into a hopper bottom car, the side wall doors 25 are swung inwardly and upwardly into the position shown in Fig. 3, wherein said doors on opposite sides of the car converge downwardly and are supported in an inclined position at a definite angle by bars 27, each of which at one end is provided with an elongated slot 28 for the reception of a pin 29 secured to an angular supporting member 30 of the side wall doors 25. The same end of each of the bars 27 is provided with a flat portion 31 which engages the side of its corresponding door while the opposite end of the bar is provided with a flat portion 32 engaging a frame member 33 for sustaining the side wall doors in their inclined positions. The inner end of each of the bars 27 is also provided with a rounded portion 34 to permit the bars 27 to be swung upwardly into a non-supporting position, whereupon the side wall doors 25 will swing downwardly into a vertical plane to form the side walls proper of the car. These supporting bars 27 when swung into a position parallel with their respective doors may be shifted slightly downwardly with respect thereto due to the slots 28, whereupon the bars will be held in their raised positions with their full length engaging the outer sides of the doors 25.

Pivotally connected to the floor angle members 35, to which the sills 14 are connected, are floor doors 36 which when the car is arranged as a flat bottom car take a horizontal position, as shown in Fig. 5 of the drawings, in which case they form a portion of the floor of the car. But when the car is converted into the hopper type of car, these floor doors 36 are swung upwardly and outwardly until the outer portions of their Z-bars 37 rest upon the side wall doors 25 whereby the floor doors 36 on each side of the car lie in the same plane with the corresponding inclined side wall doors 25. The side wall doors 25 and floor doors 36 when swung into this arrangement to form extended side portions of the hopper, lie in planes which converge downwardly, and as a matter of fact are parallel or substantially in the same planes with the main converging portions 16 of the sills 14, which planes include the shedding portion 19 and lower hopper door 21. In other words, when the side wall doors and floor doors are swung into position to form a hopper, the resultant hopper sides converge downwardly meeting at the point where the lower hopper door 21 engages the shedding portion 19, all portions of each side wall of the hopper lying substantially in the same plane. When the car is arranged in the hopper construction the end walls 13 of the car are moved toward the middle thereof and take the position shown in Fig. 2 of the drawings. Extending from the lower end of each of the end walls 13 when moved into their innermost positions are shedding hopper end walls 38 which converge downwardly.

When it is desired to change the car from a hopper type of car to a flat bottom car, the same is accomplished by shifting the end walls 13 from their inner position to their outer position, as shown in Fig. 4 and by swinging the floor doors 36 inwardly and downwardly and the side wall doors 25 outwardly and downwardly into the positions shown in Fig. 5.

It will be noted that each end of the car is provided with a central permanent or stationary floor portion 39 extending to the floor doors 36. The remaining portion of the floor of the car takes the form of a plurality of doors 40 preferably pivotally mounted at 41 to the angle members 35 on each side of the car relative to the longitudinal center line thereof and running the full length of the car. Normally these doors are held in their closed or elevated positions in a horizontal plane by chains 42 which are wound around operating shafts 43 located under the shedding members 44 adjacent the floor at the sides of the car. When the car has its door arranged to present a flat bottom, the doors 40 may be lowered by actuation of the shafts 43 for side dumping. These doors 40 are wider than usual due to the construction and arrangement of the sills 16 whereby the hopper is set down farther between the wheels. These doors accordingly when lowered permit of an increased or greater dumping action.

Attention also is called to the construction and relative arrangement of the draft sills 45 and the longitudinal sills 14. The former extend from the end sills of the car under the bolsters 46 up to the hopper ends at each end of the car. The longitudinal sills 14 are brought in toward the center of the car more nearly into alinement with the draft sills than heretofore has been the case. As a matter of fact the draft sills 45 and longitudinal sills 14 in this arrangement are made substantially continuous sills by connecting the same rigidly together by gusset plates 47. In this way the pulling and buffing strains are taken to better advantage, thereby eliminating in a great degree the necessity of transferring these strains through the bolsters. In this way also the bolsters may be decreased in width, thus making it possible to use larger dumping doors at the sides of the car, that is, the distance between the end sills and the bolsters and between the bolsters and the next adjacent cross beam is considerably enlarged.

By means of this arrangement the car is greatly lightened, pulling and buffing strains taken to better advantage and the car is convertible from a flat bottom car to a hopper type of car and vice versa in a very simple manner, and in a manner to meet the requirements for successful commercial operation. The car underframe has its longitudinal sills offset from the center of the car to form an unobstructed space for the discharge of the load, there being a longitudinal central hopper, the longitudinal sills including inclined portions extending downwardly and inwardly within the wheel base and forming part of the hopper sides. By locating the longitudinal sills as described and shown, with their inclined sides extending downwardly and inwardly within the wheel base, it is possible to substantially lower the floor of the car and its center of gravity, thereby presenting a very important advantage.

It is apparent that there may be various modifications of the invention herein particularly shown and described and it is my intention to cover all such modifications which do not depart from the spirit and scope of the invention as set forth in the following claims.

I claim:

1. A car of the class described, the underframe of which has its longitudinal sills offset from the center of the car to form an unobstructed space for the discharge of the load, and a longitudinal central hopper, said longitudinal sills including main webs inclined downwardly and inwardly within the wheel base and forming part of the hopper sides.

2. A car of the class described, the underframe of which has longitudinal sills spaced from the center of the car to form an unobstructed space for the discharge of the load, and a central hopper, said longitudinal sills including main webs inclined downwardly and inwardly wholly within the wheel base and forming part of the hopper sides.

3. In a railway car, the combination of sill members having downwardly and inwardly converging main webs forming a part of a hopper within the truck wheels of the car, and members extending downwardly from said sill members to form the bottom of said hopper, one of said members being movably mounted to permit the dumping of a load.

4. In a hopper type of car, the combination of two longitudinal sill members within the wheel base each having but one downwardly and inwardly inclined web forming a hopper portion, and draft sills connected thereto to form a rigid construction to resist pulling and buffing strains.

5. In a hopper type of car, the combination of longitudinal sills, hopper doors pivotally mounted at the upper portion of said sills and in different positions forming hopper side walls and cover, respectively, and draft sills connected to said longitudinal sills to form a rigid construction to resist pulling and buffing strains.

6. In a hopper type of car, the combination of draft sills, longitudinal sills offset with respect to said draft sills to permit dumping between said longitudinal sills, said longitudinal sills being within the wheel base and having downwardly and inwardly inclined main webs forming parts of the hopper sides, and gusset means for connecting said draft and longitudinal sills.

Signed at Chicago, Illinois, this 15th day of November, A. D. 1917.

JOHN O. NEIKIRK.